(12) United States Patent
Iwasaki et al.

(10) Patent No.: US 8,141,124 B2
(45) Date of Patent: Mar. 20, 2012

(54) MANAGING COMMUNITY PROVIDED IN INFORMATION PROCESSING SYSTEM

(75) Inventors: Hideaki Iwasaki, Fujisawa (JP); Koichi Kamijoh, Yokohama (JP); Kazuhisa Misono, Yamato (JP); Makoto Miyakawa, Tokyo (JP); Masaharu Sakamoto, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 11/559,722

(22) Filed: Nov. 14, 2006

(65) Prior Publication Data

US 2007/0118513 A1 May 24, 2007

(30) Foreign Application Priority Data

Nov. 14, 2005 (JP) ................................. 2005-329070

(51) Int. Cl.
*H04L 29/06* (2006.01)
(52) U.S. Cl. .............................................. 726/1; 726/2
(58) Field of Classification Search .................... 726/1, 2
See application file for complete search history.

(56) References Cited

U.S. PATENT DOCUMENTS

| 6,317,833 | B1* | 11/2001 | Jakobsson ...................... 713/181 |
| 6,438,632 | B1* | 8/2002 | Kikugawa ....................... 710/100 |
| 6,604,131 | B1 | 8/2003 | Warris et al. |
| 6,944,655 | B1* | 9/2005 | Bellamy et al. ................ 709/223 |
| 6,983,302 | B1* | 1/2006 | Ohashi ........................... 709/203 |
| 2001/0018704 | A1 | 8/2001 | Kikugawa |
| 2001/0056465 | A1 | 12/2001 | Aiso |
| 2002/0198866 | A1 | 12/2002 | Kraft et al. |
| 2003/0069765 | A1* | 4/2003 | Menninger ....................... 705/7 |
| 2004/0111479 | A1 | 6/2004 | Borden et al. |
| 2006/0259474 | A1 | 11/2006 | Granito |
| 2008/0126348 | A1* | 5/2008 | Chisaka ........................... 707/6 |
| 2008/0201415 | A1 | 8/2008 | Herley |
| 2009/0049017 | A1 | 2/2009 | Gross |

FOREIGN PATENT DOCUMENTS

| JP | 2002-015006 A | 1/2002 |
| JP | 2002-041430 A | 2/2002 |
| JP | 2002-073619 A | 3/2002 |
| JP | 2002-108760 A | 4/2002 |
| JP | 2002-183033 A | 6/2002 |

(Continued)

OTHER PUBLICATIONS

Office Action from U.S. Appl. No. 12/206,665 dated Apr. 22, 2009.

(Continued)

*Primary Examiner* — David García Cervetti
(74) *Attorney, Agent, or Firm* — Shimokaji & Assoc., P.C.

(57) ABSTRACT

Provided is a system which manages a user community provided in an information processing system, in which user community information provided by a user is made available to another user for reference. The system includes a storage section which stores an audit policy defining contents of information to be permitted to be registered in each of a plurality of communities, by associating the audit policy with each of the communities; a detection section which detects a community to which information is provided in response to provision of the information by a user; and a registration control section which inhibits registration of information, provided by a user, in a detected user community on condition that the information violates an audit policy corresponding to the user community.

15 Claims, 6 Drawing Sheets

FOREIGN PATENT DOCUMENTS

| | | | | |
|---|---|---|---|---|
| JP | 2004187206 | * | 2/2004 | |
| JP | 2004-152193 A | | 5/2004 | |
| JP | 2004-187206 | | 7/2004 | ........................ 12/66 |
| JP | 2005-025657 | | 1/2005 | ............................ 7/4 |
| JP | 2005-092305 A | | 4/2005 | |
| WO | WO99/46683 | | 9/1999 | |

OTHER PUBLICATIONS

Office Action from U.S. Appl. No. 12/206,665 dated Nov. 30, 2009.

* cited by examiner

| COMMUNITY ID | USER ID | ATTRIBUTE | |
|---|---|---|---|
| | | AGE | ... |
| ⋮ | ⋮ | ⋮ | ... |
| 1234 | 13645<br>12493<br>35621<br>15425<br>⋮ | 13<br>18<br>25<br>19<br>⋮ | ... |
| 1235 | 35621<br>14542<br>32156<br>⋮ | 25<br>22<br>35<br>⋮ | ... |
| ⋮ | ⋮ | ⋮ | ... |

| COMMUNITY ID | AUDIT POLICY |
|---|---|
| ⋮ | ⋮ |
| 1234 | POLITICS/ECONOMY, VIOLENCE, LATE-NIGHT BROADCAST, PORNOGRAPHY |
| 1235 | VIOLENCE, PORNOGRAPHY |
| ⋮ | ⋮ |

MANAGING COMMUNITY PROVIDED IN INFORMATION PROCESSING SYSTEM

CROSS-REFERENCE TO RELATED APPLICATIONS

This application claims priority under 35 U.S.C. §119 to Japan Patent Application No. JP2005-329070 filed Nov. 14, 2005, the entire text of which is specifically incorporated by reference herein.

BACKGROUND OF THE INVENTION

The invention relates to a system for managing a community provided in an information system, and a method thereof. Specifically, the invention relates to a system for controlling registration of information in the community, and to a method thereof.

Recently, with an increased use of communication networks, user communities have been provided in information systems in which a specific or an unspecified user registers information to be available to other users for reference. There already exist bulletin boards, weblogs, mailing lists, news groups, webcasts, multiplayer online games, or versus games as examples of such user communities.

In such a user community, information provided by a user may be against discipline and order of a community and public decency. In such a case, other users may feel uncomfortable viewing such information, and furthermore, may engage less in the community to make it impossible to continue running the community. A method of defining, by a rule, information to be permitted to be registered is conceivable. However, a user may inadvertently register information violating the rule. For this reason, a method of controlling the registration of information with a sort of technical means is desired.

As a technology for reference, there has been proposed a technology in which predetermined keywords such as censored words are replaced with predetermined words such as "***" or "beep" sound (refer to Japanese Patent Laid-Open No. 2005-025657). In addition, as another technology for reference, there has been proposed a technology for dropping a communication packet for requesting information when the combination of the destination URL and the source IP address is a specific one (refer to Japanese Patent Laid-Open No. 2004-187206). According to this technology, it is possible to inhibit a specific user from accessing a specific URL.

However, types of unregisterable information may vary depending on user communities. Specifically, in a user community created by users having specific tastes, types of information unregisterable in another community may be registrable. In addition, information which used to be registrable may become unregisterable with times changing. As described, it is difficult to uniformly determine types of unregisterable information in advance. Thus, it is difficult to appropriately manage a plurality of user communities as a whole, with the technology proposed in the Japanese Patent Laid-Open No. 2005-025657 alone.

According to the technology in Japanese Patent Laid-Open No. 2004-187206, availability of information for browsing can be set on a user basis. However, a user to whom the technology in Japanese Patent Laid-Open No. 2004-187206 does not apply is free to browse information disclosed in a homepage with a specific URL. Such a privileged user as an administrator of an information processing system, can browse the information as well. In other words, it is generally difficult to bring information, once disclosed to the public, back to be undisclosed again. Thus, a technology is desired for limiting registration of information while the information is still undisclosed.

BRIEF SUMMARY OF THE INVENTION

One exemplary aspect of the present invention is a system for managing a user community provided in an information processing system. In such a user community, the information provided by a user is made available to another user for reference. The system includes a storage section storing an audit policy. The audit policy defines contents of information to be permitted to be registered in the user community. The storage section associates the audit policy with each of a plurality of user communities. A detection section detects the user community to which information is provided, in response to provision of the information by the user. A registration control section causes the information, provided by the user, not to be registered in the detected user community on condition that the information violates the audit policy corresponding to the detected user community.

Another exemplary aspect of the invention is a server device for managing a user community provided in an information processing system. Information provided by a user is made available to another user for reference. The server device includes a storage section for storing an audit policy. The audit policy defines contents of information to be permitted to be registered in the user community. The storage section associates the audit policy with each of a plurality of user communities. A detection section is configured to detect a user community to which information is provided in response to receiving provision of the information by the user from a terminal device of the user. A registration control section causes the information, provided by the user in the detected user community, not to be registered in the detected user community on condition that the provision of the information violates an audit policy corresponding to the user community. The detection section and the registration control section are each provided corresponding to the user.

A further aspect of the invention is a client device. The client device registers information provided by a user in a server device managing a user community. The user community is provided in an information processing system, which information is made available to another user for reference. The client device includes an acquisition section configured to acquire an audit policy. The audit policy defines contents of information to be permitted to be registered in each of a plurality of user communities by associating the audit policy with each of the user communities. A detection section detects the user community to which information is provided in response to receiving provision of the information by the user from a terminal device of the user. A registration control section causes the information in the detected user community not to be registered in the detected user community on condition that the provision of the information by the user violates the audit policy corresponding to the user community. The acquisition section, the detection section and the registration control section are each provided corresponding to the user.

Yet a further aspect of the invention is a computer program embodied in tangible medium causing an information processing system to function as a system managing a user community provided in the information processing system. User community information provided by a user is made available to another user for reference. The computer program causes the information processing system to function as a storage section storing an audit policy defining contents of information to be permitted to be registered in the user community, by associating the audit policy with each of a plurality of user communities; a detection section detecting the user community to which information is provided in response to provision of the information by a user; and a registration control section causing the information provided by the user not to be registered in the detected user community, on condition that the information violates the audit policy corresponding to the user community.

Another exemplary aspect of the invention is a method of managing a user community provided in an information processing system, in which information provided by a user is made available to another user for reference. The method includes a storing operation for storing an audit policy defining contents of information to be permitted to be registered in the user community by associating the audit policy with each of a plurality of user communities. A detecting operation detects the user community to which information is provided in response to provision of the information by a user, An inhibiting operation inhibits registration of the information, provided by the user, in the detected user community, on condition that the information violates an audit policy corresponding to the user community.

Note that the above-described overview of the invention does not list all of the necessary characteristics of the present invention, and the present invention can include sub-combinations of the characteristics.

BRIEF DESCRIPTION OF THE SEVERAL VIEWS OF THE DRAWINGS

For a more complete understanding of the present invention and the advantages thereof, reference is now made to the following description taken in conjunction with the accompanying drawings.

DETAILED DESCRIPTION OF THE INVENTION

Hereinafter, the invention will be described through an embodiment of the invention. However, the following embodiment does not limit the invention according to the scope of claims, and not all the combinations of characteristics described in the embodiment are necessary for solving means of the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Figure 1:
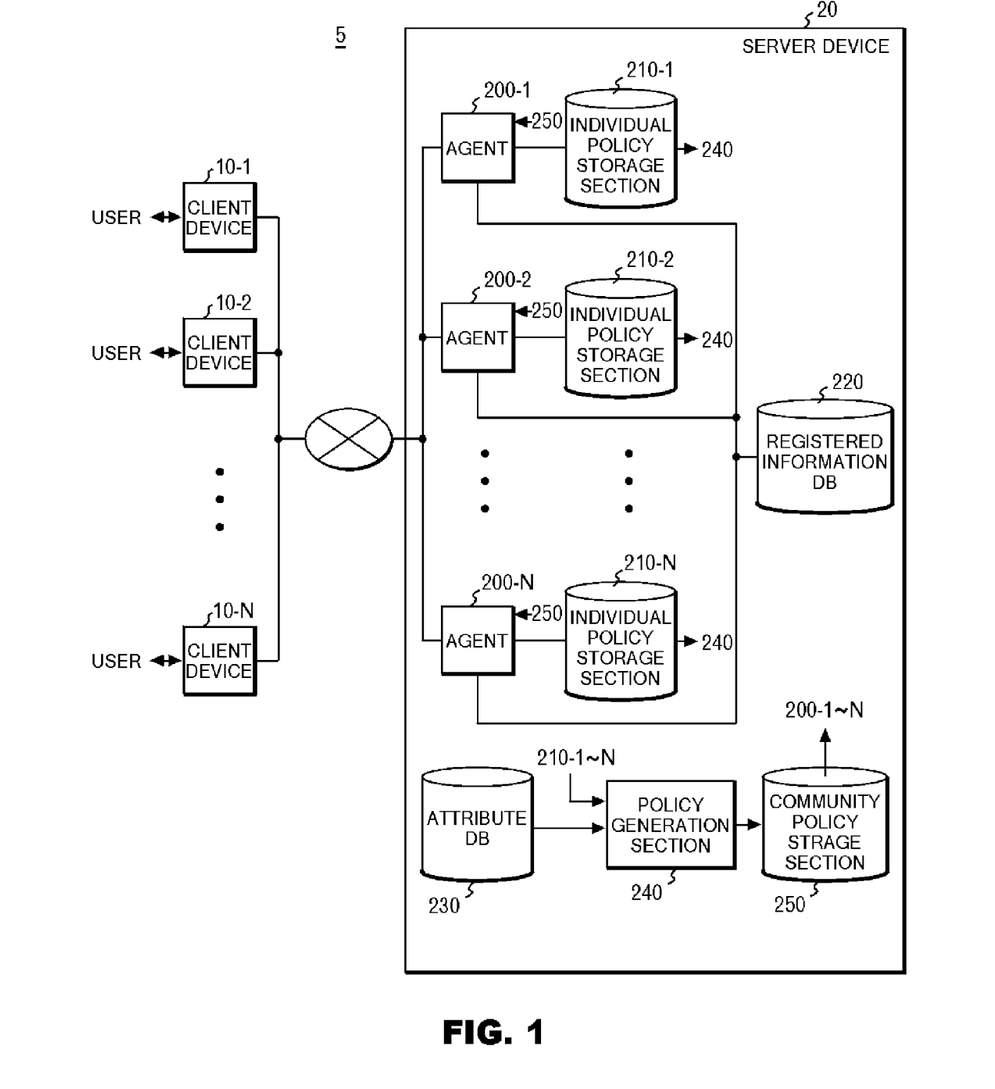
FIG. 1 illustrates the whole configuration of an information processing system 5.

FIG. 1 illustrates the whole configuration of an information processing system 5. The information processing system 5 manages a user community in which information provided by a user is made available to other users for reference. The information system 5 includes client devices 10-1 to 10-N and a server device 20. The client devices 10-1 to 10-N are provided respectively to a plurality of different users. Each of the client devices 10-1 to 10-N provides information received from a corresponding user thereof to the server device 20. The server device 20 determines whether received information is to be registered in a registered information DB 220, based on an audit policy. In so doing, the server device 20 applies different policies to different user communities to which the received information is provided. An object to be accomplished by the information processing system 5 is to let the users exchange information as freely as possible while appropriately maintaining discipline and order of each user community.

The server 20 includes agents 200-1 to 200-N, individual policy storage sections 210-1 to 210-N, a registered information DB 220, an attribute DB 230, a policy generation section 240, and a community policy storage section 250. The agents 200-1 to 200-N are provided corresponding respectively to the client devices 10-1 to 10-N. Upon receiving information from the client devices 10-1 to 10-N, the agents 200-1 to 200-N respectively determine whether the information violates the audit policy. This audit policy includes individual policies stored respectively in the individual policy storage sections 210-1 to 210-N, and a user community policy stored in the community policy storage section 250.

On condition that received information violates an audit policy, each of the agents 200-1 to 200-N informs each of the client devices 10-1 to 10-N of the violation. In this case, each of the agents 200-1 to 200-N further informs each of the users of the audit policy inhibiting the registration of the received information. Thus, the users can be accurately informed of what type of information is inhibited from being registered to make this a guide for future provision of information. Meanwhile, if the received information does not violate the audit policy, each of the agents 200-1 to 200-N registers the received information in the registered information DB 220. The registered information DB 220 manages the information newly registered thereto in a state where the agents 200-1 to 200-N make the newly registered information available for reference by the respective client devices 10-1 to 10-N.

Specifically, the registered information DB 220 stores information, associating it with each of a plurality of user communities to which it is provided and in which it is registered. When receiving requests for browsing information from the client devices 10-1 to 10-N via respective agents 200-1 to 200-N, the registered information DB 220 sends the requested information back to each of the client devices 10-1 to 10-N on condition that the user requesting for browsing the information are a member of the user community in which the information is registered.

The attribute DB 230 stores attributes of users participating in the user community. In addition to the age, sex, nationality, religion and the like of the user, the answer to a predetermined questionnaire carried out for the user may be used as an attribute. The policy generation section 240 generates an audit policy based on attributes stored in the attribute DB 230, and stores the audit policy in the community policy storage section 250. For instance, having specified the ages of all users joining a user community based on the attributes stored in the attribute DB 230, the policy generation section 240, with audit policies appropriate for respective age groups being stored beforehand, may store, in the community policy storage section 250, audit policies of the age group to which the specified ages belong.

Alternatively, the policy generation section 240 may store, in the community policy storage section 250, an audit policy of a user community, which is generated based on the individual policies stored respectively in the individual policy storage sections 210-1 to 210-N. For instance, the policy generation section 240 may store, in the community policy storage section 250, the strictest individual policy (having the most restraints on registration) selected among individual policies of respective individual users, as an audit policy of the user community to which the user belongs. Alternatively, the policy generation section 240 may generate and store, in the community policy storage section 250, an audit policy whose restraints on registration is a union of sets of restraints of individual policies of respective users. Alternatively, the policy generation section 240 may select, as an audit policy, a common part of contents of individual policies of respective individuals participating in a user community shared by not less than a predetermined proportion of users, and may store the part in the community policy storage section 250.

The community policy storage section 250 stores an audit policy in association with each of a plurality of user communities, which audit policy defines contents of information registrable in the user community. The audit policy may be generated by, for instance, the policy generation section 240 as described. Alternatively, an audit policy may be determined beforehand and inputted by an administrator who manages disciplines and order of each community. The audit policy may be not encrypted since there is little inconvenience even if the audit policy is known to a third party other than the users of the user community. However, it is desirable that the audit policy be stored in conjunction with attached data which makes a fraudulent manipulation detectable. For instance, a digital signature of a policy creator or of an administrator may be attached to the audit policy.

Note that, preferably, each of the individual policy storage sections 210-1 to 210-N encrypts its corresponding individual policy with a code which can be decrypted by a registration control section in the agent provided corresponding to a user corresponding to the individual policy, and thus stores the resultant individual policy. Specifically, the agent 200-1 alone can decrypt the individual policy encrypted and stored in the individual policy storage section 210-1, and the agent 200-2 alone can decrypt the individual policy encrypted and stored in the individual policy storage section 210-2. In addition, when encryption of individual policy is difficult, or when processing time for encryption and decryption needs to be saved, the individual policy storage sections 210-1 to 210-N may be respectively provided to the client devices 10-1 to 10-N in place of the configuration in FIG. 1. In this case, the agents 200-1 to 200-N acquire individual policies respectively from the individual policy storage sections 210-1 to 210-N provided respectively to client devices 10-1 to 10-N. Thereafter, each of the agents 200-1 to 200-N audits information based on the received individual policy. With such a configuration, encryption of individual policy becomes unnecessary, and each user can modify and add an item to the individual policy without communicating with the server device 20. Thus, the user can enjoy an enhanced convenience.

Figure 2:
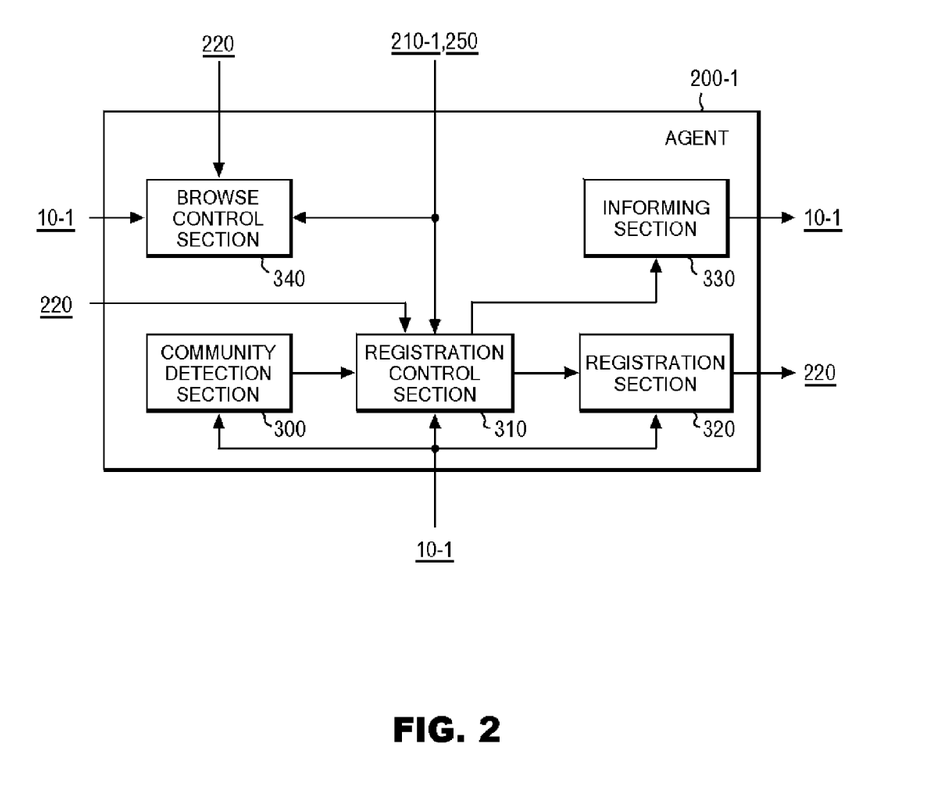
FIG. 2 illustrates a functional configuration of an agent 200-1.

FIG. 2 illustrates a functional configuration of the agent 200-1. In FIG. 2, descriptions will be provided for the agent 200-1 as a representative of the agents 200-1 to 200-N since each of the agents 200-2 to 200-N has approximately the same configuration as that of the agent 200-1. The agent 200-1 includes a community detection section 300, a registration control section 310, a registration section 320, an informing section 330 and a browse control section 340. The agent 200-1 receives information from a user via the client device 10-1. The community detection section 300 detects a user community to which the information is provided in response to the provision of the information by the user. For instance, in a case where provided information includes identification of a user community to which the information is provided, the community detection section 300 may detect the user community to which the information is provided, based on the identification.

The registration control unit 310 determines whether the information provided by the user violates an audit policy corresponding to the detected user community. For instance, on condition that the information provided by the user includes a keyword set by the audit policy, the registration control section 310 may determine that the information violates the audit policy. On condition that the information violates the audit policy, the registration control section 310 inhibits the registration of the information in the user community. The audit policy mentioned here includes the individual policy stored in the individual policy storage section 210-1, and the audit policy corresponding to the user community, which is stored in the community policy storage section 250. On the other hand, when the information does not violate the audit policy, the registration control section 310 sends the information to the registration section 320. On condition that the registration control section 310 permits the registration of information, the registration section 320 encrypts the information with a code which can be decrypted by a user participating in the user community. Thereafter, the registration section 320 registers the encrypted information to be accessible to a user participating in the user community.

The registration control section 310 may have another function for auditing information previously registered, in addition to the functions described above. Specifically, on condition that the registration control section 310 detects an update of the audit policy stored in the community policy storage section 250, the registration control section 310 may determine that each piece of information, having been previously stored in the user community corresponding to the updated audit policy, violates the updated audit policy. On condition that the information violates the updated audit policy, the informing section 330 informs the user that the information violating the updated audit policy should be modified. In addition, the registration section 320 may delete the information violating the audit policy from the registered information DB 220 on condition that, for instance, the user consents to the deletion. On condition that the information provided from the user violates the audit policy corresponding to the detected user community, the informing section 330 informs the user of the audit policy inhibiting the registration of the provided information.

In this regard, in a case where the provided information is a tagged document such as HTML (Hyper Text Markup Language) document, information in the link destination of a hyperlink is preferably audited as well. Specifically, in a case where a piece of information provided by a first user includes a hyperlink for a different piece of information, the browse control section 340 may audit the different piece of information in the link destination of the hyperlink when being browsed. For instance, in response to another user's selecting the hyperlink, the browse control section 340 may determine whether the different piece of information in the link destination violates the individual policy corresponding to the first user. In this case, on condition that the different piece of information in the link destination violates the individual policy, the browse control section 340 may control the different piece of information in the link destination in order that the other user cannot browse the different piece of information in the link destination. Thus, it is possible to audit the piece of information registered by the first user and the different piece of information in the link destination of the hyperlink included in the registered information, based on the individual policy of the first user.

Figure 3:
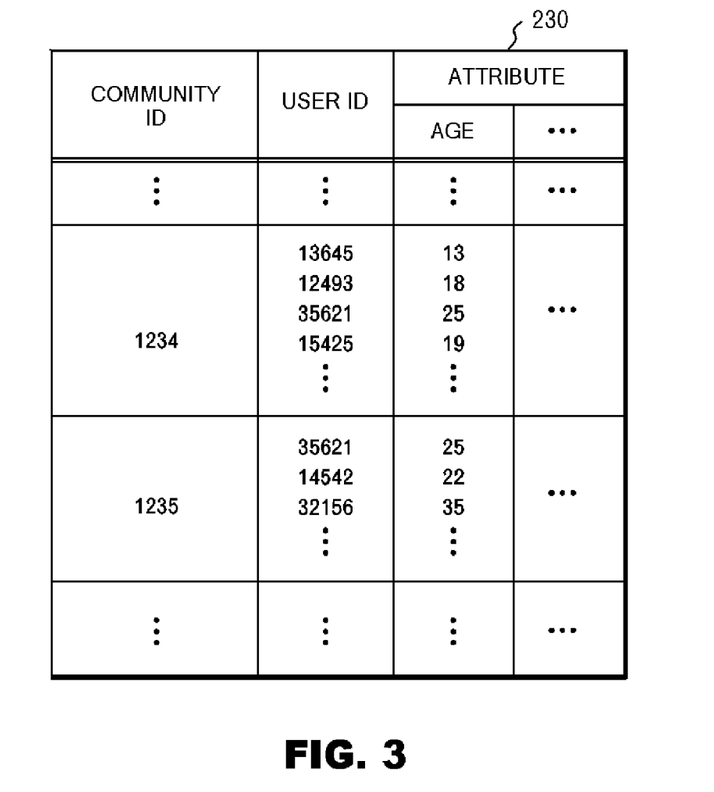
FIG. 3 illustrates an example of a data structure of an attribute DB 230.

FIG. 3 illustrates an example of a data structure of the attribute DB 230. In the attribute DB 230, identifications (ID) of respective user communities and attributes of respective users each participating in the user community are stored. In FIG. 3, the ages of the users are shown as an example of the attributes. For instance, users aged from 13 to 25 belong to a user community (1234). Users aged from 22 to 35 belong to another user community (1235). The policy generation section 240 may generate an audit policy of the user community based on the attributes of the users. For instance, since there are users under 14 years of age in the user community (1234), the strictest audit policy previously determined may be selected as the audit policy of the user community. Meanwhile, since no user under 20years of age belongs to the user community (1235), the policy generation section 240 may select an audit policy under which information can be exchanged as freely as possible. Note that an audit policy once generated may be modified by an administrator of a user community. Accordingly, it is possible to reduce the load of the administrator compared to the case where an audit policy is newly generated from scratch.

Figure 4:
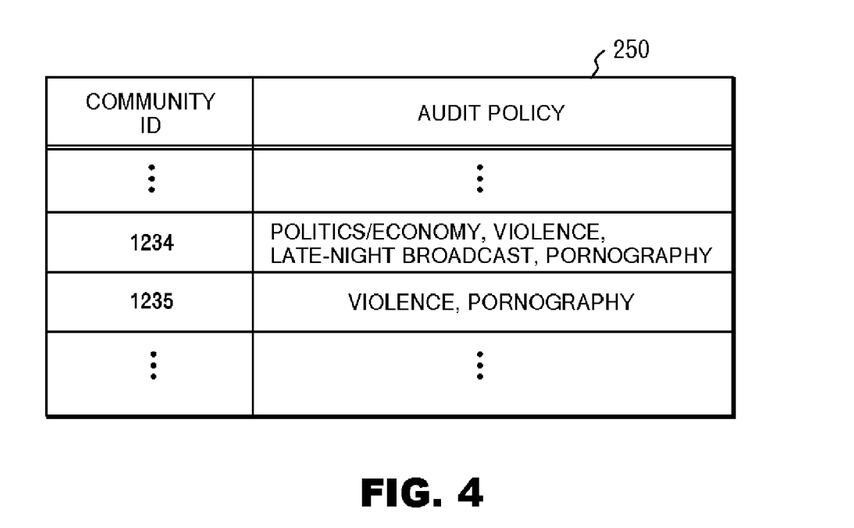
FIG. 4 illustrates an example of a data structure of a community policy storage section 250.

FIG. 4 illustrates an example of a data structure of the community policy storage section 250. The community policy storage section 250 stores audit policies respectively in association with a plurality of user communities, each of the audit policies defining contents of information registrable in each of the user communities. Each of the audit policies shown in the example of the FIG. 4 defines genres of unregisterable information. In the user community (1234), information on politics/economy, violence, late-night broadcast and pornography is unregisterable. The registration control section 310, for instance, determines whether a predetermined keyword previously set for information of these kinds is included in the provided information. The registration section 310 may determine that the provided information is on "violence" when a keyword "suicide" is included in the provided information. In this case, the registration control section 310 inhibits the registration of the provided information.

Note that the community policy storage section 250 may store information modification methods, each of which is a method of modifying information violating respective one of a plurality of audit policies to make the information in conformity with the audit policy, while associating the methods with respective audit policies. In this case, on condition that information provided by a user violates an audit policy, the informing section 330 informs the user of the information modification method in association with the audit policy. For instance, the community policy storage section 250 may inform a user of a method of converting a specific word by use of a word conversion dictionary. The community policy storage section 250 may inform the user, as the information modification method, that words specifically indicating violence, such as "bash" and "stab repeatedly" should be converted into general words such as "injure" to make them less inciteful for minors, for instance. The information modification method may include deletion of the information itself, such as requiring to delete the information itself when it is pornographic.

Figure 5:
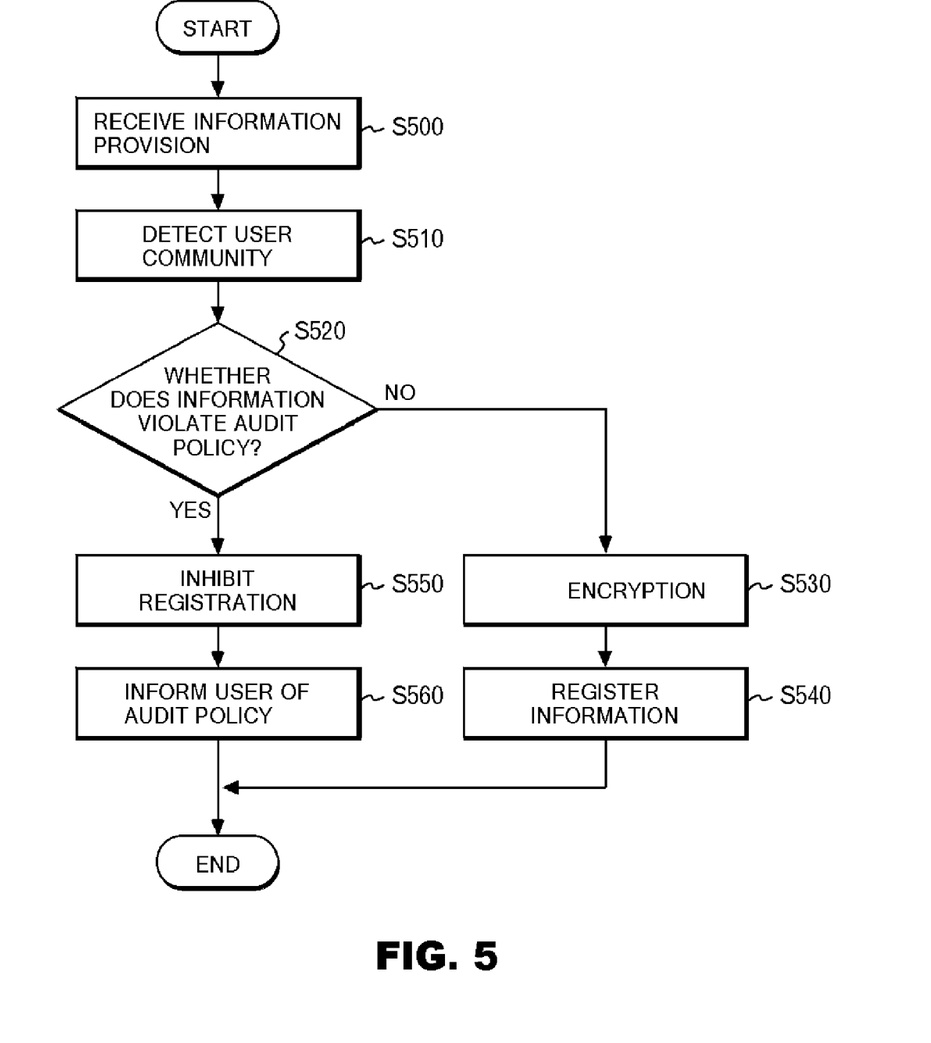
FIG. 5 illustrates an example of processing for auditing information provided by a user by means of an audit policy.

FIG. 5 illustrates an example of processing for auditing information provided by a user by use of an audit policy. First, the agent 200-1 receives information from a user (S500). Subsequently, in response to the provision of the information by the user, the community detection section 300 detects a user community to which the information is provided (S510). The registration control section 310 determines whether the information provided by the user violates an audit policy corresponding to the detected user community or an individual policy corresponding to the user who provides the information (S520). When the information does not violate the audit policy or the individual policy, (S520: NO), the registration section 320 encrypts the information with a code which can be decrypted by a user participating in the user community (S530). Thereafter, the registration section 320 registers the information in the registered information DB 220 to make it accessible to a user participating in the user community (S540).

Meanwhile, on condition that the information violates the audit policy or the individual policy (S520: YES), the registration control section 310 inhibits the registration of the information in the user community (S550). Then, the registration control section 310 informs the user of the audit policy inhibiting the registration of the information (S560).

Figure 6:
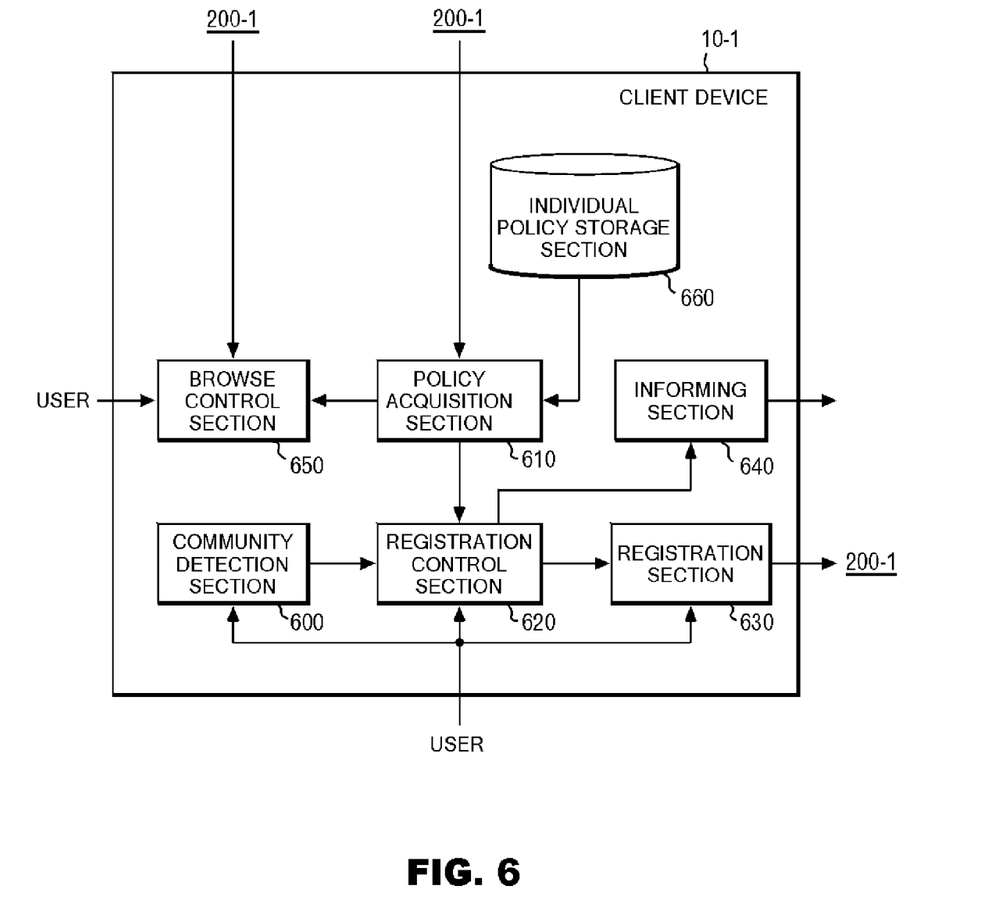
FIG. 6 illustrates a functional configuration of a client device 10-1 in a modified example of the embodiment.

FIG. 6 illustrates a functional configuration of a client device 10-1 in a modified example of the embodiment. In the modified example, different from the embodiment described in FIGS. 1 to 5, the client device 10-1 determines whether information violates an audit policy. In this modified example, each of agents 200-1 to 200-N does not have to include the components described in FIG. 2. Specifically, each of the agents 200-1 to 200-N does not have to include the community detection section 300, the registration control section 310, the registration section 320, the informing section 330 and the browse control section 340. In stead of using these sections, the agents 200-1 to 200-N acquire individual policies respectively from individual policy storage sections 210-1 to 210-N, and acquire an audit policy of the user community from a community policy storage section 250. Thereafter, the agents 200-1 to 200-N send the individual policies and the audit policy to the respective client devices 10-1 to 10-N. In this case, the policies to be sent are preferably encrypted with a session key between each of the client servers 10-1 to 10-N and the server device 20.

In this modified example, the client device 10-1 includes a community detection section 600, a policy acquisition section 610, a registration control section 620, a registration section 630, an informing section 640, a browse control section 650 and an individual policy storage section 660. The client device 10-1 accepts input of information from a user. In response to the provision of the information by a user, the community detection section 600 detects a user community to which the information is provided. The policy acquisition section 610 acquires an audit policy, which defines contents of information registrable in each of a plurality of user communities, from the agent 200-1 by associating the audit policy with the user community. In addition, the policy acquisition section 610 acquires an individual policy corresponding to the user from the individual policy storage section 660. Alternatively, the policy acquisition section 610 may acquire the individual policy corresponding to the user from the agent 200-1.

On condition that the provision of information by the user violates the audit policy corresponding to the detected user community, the registration control section 620 inhibits the registration of the information in the user community. Specifically, when the provision of information by the user violates the audit policy, the registration section 630 does not send the information to the agent 200-1. When the provided information does not violate the audit policy, the registration section 630 sends the information to the agent 200-1. On condition that the provision of information violates the audit policy, the informing section 640 may inform the user of the audit policy inhibiting the registration of the provided information.

As described, it is possible to audit the information to determine whether the information can be provided, by use of the audit policy corresponding to the user community to which the information is provided in this modified example as in the case of the example shown in FIGS. 1 to 5. Furthermore, in the modified example, since the processing itself for auditing is performed by the client device, it is possible to prevent concentration of loads on the server 20 and to reduce a risk that the information violating the audit policy may leak out.

Figure 7:
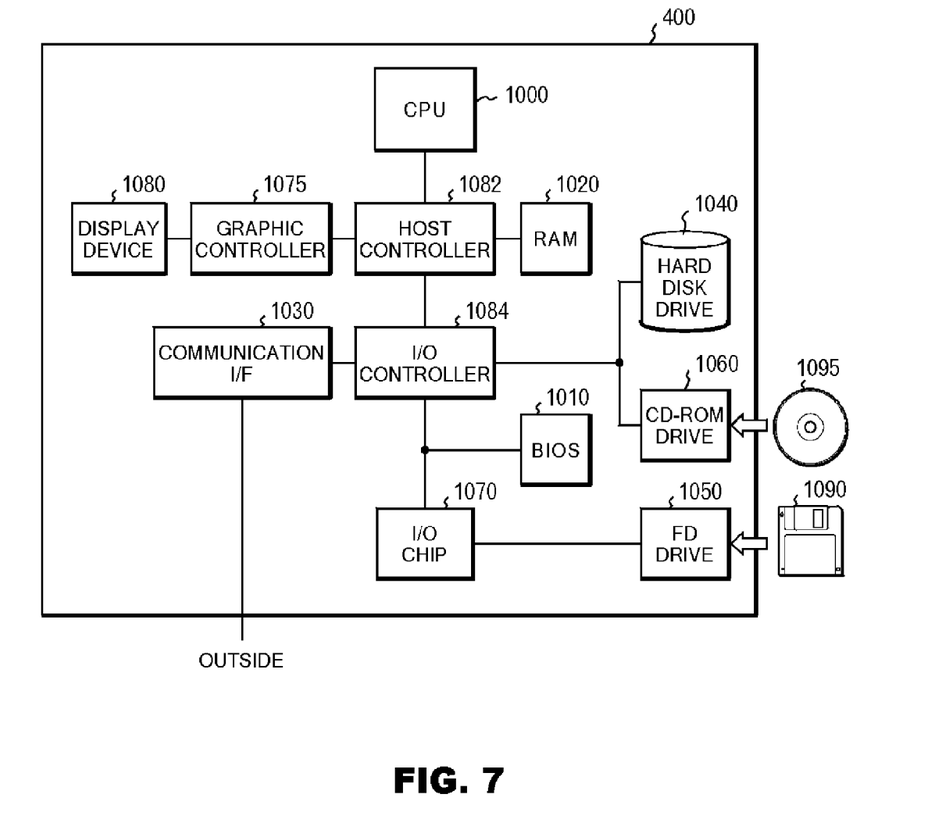
FIG. 7 illustrates an example of a hardware configuration of the information processing device 400 functioning as a server device 20 in the embodiment or in the modified example.

FIG. 7 illustrates an example of a hardware configuration of an information processing apparatus 400 functioning as each of the client devices 10-1 to 10-N or as the server device 20 in the embodiment or in the modified example. The information processing apparatus 400 includes a CPU peripheral section including a CPU 1000, a RAM 1020 and a graphic controller 1075, all of which are connected to one another by a host controller 1082; an input/output section including a communication interface 1030 connected to the host controller 1082 via an input/output controller 1084, a hard disk drive 1040 and a CD-ROM drive 1060; and a legacy input/output section including a BIOS 1010 connected to the input/output controller 1084, a flexible disk drive 1050 and an input/output chip 1070.

The host controller 1082 connects the RAM 1020 with the CPU 1000 and the graphic controller 1075 accessing the RAM 1020 at a higher transfer rate. The CPU 1000 operates based on programs stored in the BIOS 1010 and the RAM 1020 and controls each of the sections. The graphic controller 1075 acquires an image data generated by the CPU 1000 or the like in a frame buffer provided in the RAM 1020, and then causes the image data to be displayed on a display device 1080. Alternatively, the graphic controller 1075 may include a frame buffer in which image data generated by the CPU or the like are stored.

The input/output controller 1084 connects the host controller 1082 with each of the communication interface 1030, the hard disk drive 1040 and the CD-ROM drive 1060, which are relatively high speed input/output devices. The communication interface 1030 communicates with an external device via a network. The hard disk drive 1040 stores a program and data used by the information processing device 400. The CD-ROM drive 1060 reads a program or a data from the CD-ROM 1095, and provides the program or the data to the RAM 1020 or the hard disk drive 1040.

In addition, the BIOS 1010 and relatively low speed input/output devices, such as the flexible disk drive 1050 and the input/output chip 1070, are connected to the input/output controller 1084. The BIOS 1010 stores a boot program executed by the CPU 1000 when the information processing device 400 boots, a program dependent on the hardware of the information processing device 400, and the like. The flexible disk drive 1050 reads a program or a data from the flexible disk 1090, and provides the program or the data to the RAM 1020 or the hard disk drive 1040 via the input/output chip 1070. The input/output chip 1070 connects the flexible disk 1090 and each of various types of input/output devices with one another via, for instance, a parallel port, a serial port, a keyboard port, a mouse port, or the like.

A user provides a program to the information processing device 400, the program being stored in a recording medium such as the flexible disk 1090, the CD-ROM 1095 or an IC card.

The program is read from the recording medium via the input/output chip 1070 and/or the input/output controller 1084, and is installed in the information processing device 400 to be executed. Descriptions for operations which are performed by the information processing device 400 or the like instructed by the program will be omitted since the operations are the same as those of the server device 20 described in FIGS. 1 to 6.

The program described above may be stored in an external storage medium. As the storage medium, it is possible to use, other than the flexible disk 1090 and the CD-ROM 1095, an optical recording medium such as a DVD or a PD, an optical magnetic recording medium such as a MD, a tape medium, a semiconductor memory such as an IC card, or the like. The program may be provided to the information processing device 400 via a network by using, as a recording medium, a storage medium such as a hard disk or a RAM provided in a server system connected to a dedicated communication network or the Internet.

The invention is described above with the embodiment. The scope of the technology of the invention, however, is not limited to the one described in the above embodiment. It is obvious for those skilled in the art that the embodiment describe above can be changed and improved in a variety of ways. It is obvious, from the scope of claims, that the embodiments as being changed and improved can be included in the scope of technology of the invention.

According to the present invention, it is possible to appropriately manage contents of information registrable in a user community.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A system for managing a user community provided in an information processing system, in which information provided by a user is made available to another user for reference, the system comprising:
   a storage section configured to store, using a computer processor,
      an audit policy defining contents of information permitted to be registered in a registered information database of the user community, and
      an individual policy that defines details, for each of a plurality of users, the information to be permitted to be registered into the registered information database by each respective one of the users in the user community;
   a detection section configured to detect the user community to which the information is provided, in response to provision of the information by the respective one of the users;
   a registration control section configured to cause the information provided by the respective one of the users to not be registered in the user community if the information violates the audit policy corresponding to the detected user community; and
   a browse control section configured to prevent selection of hyperlinks that connect to information that violates the individual policy for the respective one of the users.

2. The system according to claim 1, further comprising;
   an informing section configured to inform the respective one of the users of the audit policy and to inhibit the registration of the information provided by the respective one of the of users if the information violates the audit policy corresponding to the detected user community.

3. The system according to claim 1, wherein:
   the registration control section causes the information provided by the respective one of the users to not be registered in the user community if the information violates the audit policy or the individual policy corresponding to the respective one of the users.

4. The system according to claim 1,
   including an informing section configured to inform the respective one of the users that information violating the audit policy should be modified,
   wherein, if an update of the audit policy is detected, the registration control section determines whether each piece of information that has been already registered in the user community corresponding to the updated audit policy violates the audit policy.

5. The system according to claim 1, including a policy generation section configured to generate the audit policy corresponding to the user community based on attributes of the users participating in the user community, and to store the audit policy in the storage section.

6. The system according to claim 1, including a policy generation section that generates the audit policy corresponding to the user community based on each of a plurality of individual policies respectively corresponding to the users participating in the user community.

7. A server device for managing a user community provided in an information processing system, in which information provided by a user is made available to another user for reference, the system comprising:
   a storage section configured to store, using a computer processor,
      an audit policy defining contents of information permitted to be registered in a registered information database of the user community and
      a plurality of policies that define, for each of a plurality of users, details of the information permitted to be registered into the registered information database by each respective one of the users in the user community;
   a detection section configured to detect a user community to which provision is made in response to receiving provision of the information by the one of the users from a terminal device of the one of the users;
   a registration control section configured to cause the information provided by the respective one of the users to not be registered in the user community if the information violates the audit policy corresponding to the detected user community; and
   a browse control section configured to prevent selection of hyperlinks that connect to the information that violates a policy for the respective one of the users.

8. The server device according to claim 7, wherein:
   the registration control section causes the information provided by the one of the users to not be registered in the user community if the information violates an audit policy or the individual policy corresponding to the respective one of the users;
   the individual policy stored in the storage section is encrypted with a code that can be decrypted by the registration control section corresponding to the respective one of the users corresponding to the individual policy; and
   the storage section stores a plurality of methods for modification of the information violating the audit policy.

9. The server device according to claim 7, including a registration section configured to encrypt the information with a code if the registration control section permits registration of the information, wherein:

the information is decrypted by the one of the users participating in the user community, and the registration section registers the encrypted information such that the encrypted information is made accessible to the one of the users participating in the user community.

10. A computer program stored on a non-transitory computer readable medium for causing an information processing system to function as a system managing a user community provided in the information processing system, in which information provided by a user is made available to another user for reference, the computer program being configured to cause the information processing system to:

store, using a computer processor, an audit policy defining contents of information permitted to be registered in a registered information data base of the user community and a plurality of individual policies that define details, for each of a plurality of users, of the information permitted to be registered into the registered information database by each respective one of the users in the user community, wherein the stored audit policy is a union of restraints for a plurality of individual policies of the users in the user community;

detect the user community to which information is provided, in response to provision of the information by said each respective one of the users;

cause the information provided by said each respective one of the users to not be registered in the user community if the information violates the audit policy corresponding to the detected user community; and prevent selection of hyperlinks that connect to information that violates the individual policy for the respective one of the users.

11. The program according to claim 10, wherein the program causes the information processing system to generate the audit policy corresponding to the user community based on attributes of users participating in the user community, and to store the audit policy in the storage section.

12. The program according to claim 10, wherein the program causes the information processing system to generate the audit policy corresponding to the user community based on each of the individual policies respectively corresponding to users participating in the user community.

13. The program according to claim 10, wherein a plurality of client devices are informed of policy violations by one of a plurality of agents.

14. The program according to claim 10, wherein each of a plurality of agents is used to register information that does not violate the audit policy.

15. The program according to claim 10, wherein the first user is informed of methods of converting words by the use of a conversion dictionary.

* * * * *